Aug. 16, 1932.  J. FREDRICH  1,871,599
MANURE LOADER
Filed Sept. 30, 1930   4 Sheets-Sheet 1
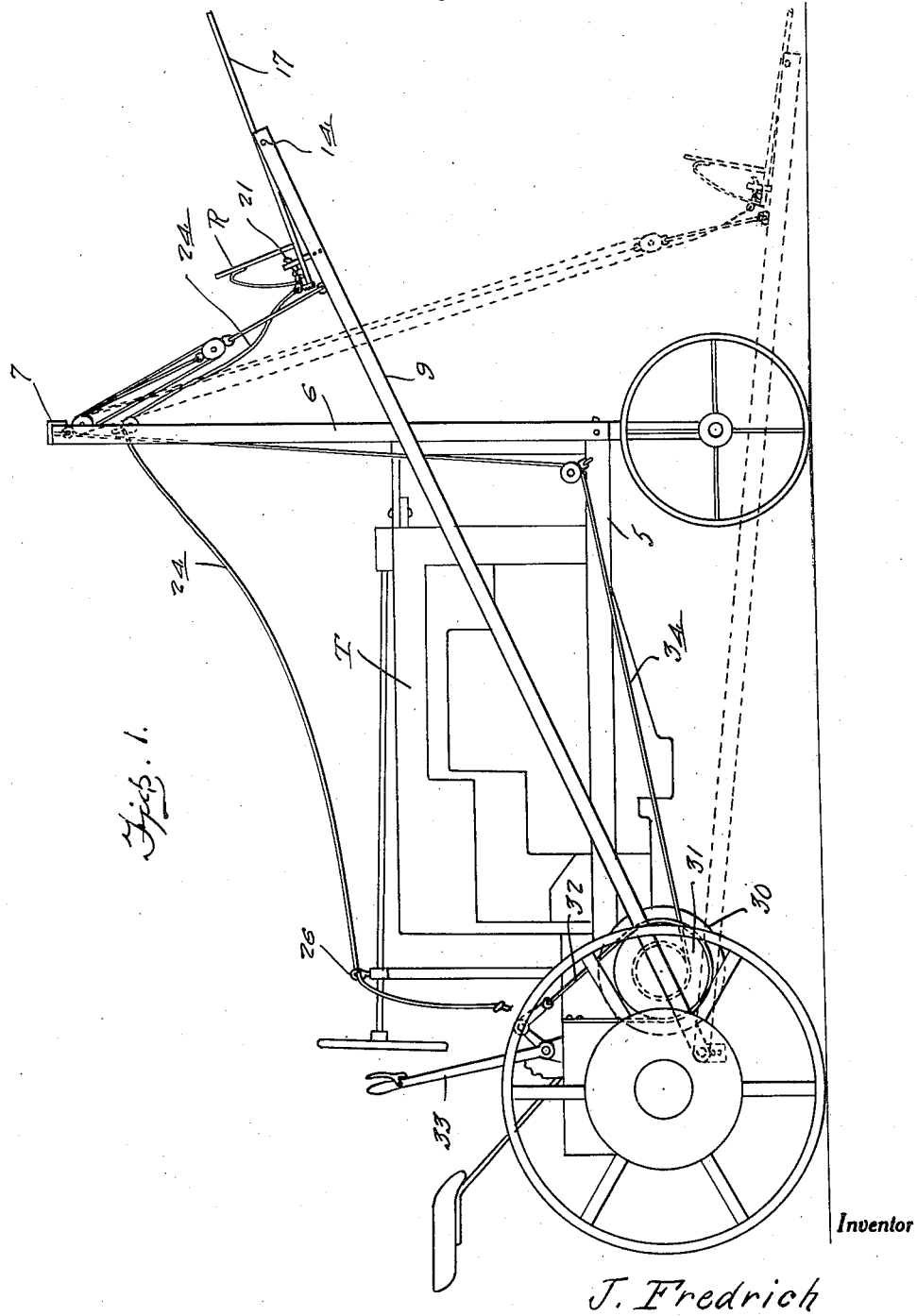
Inventor
J. Fredrich
By Clarence A. O'Brien
Attorney

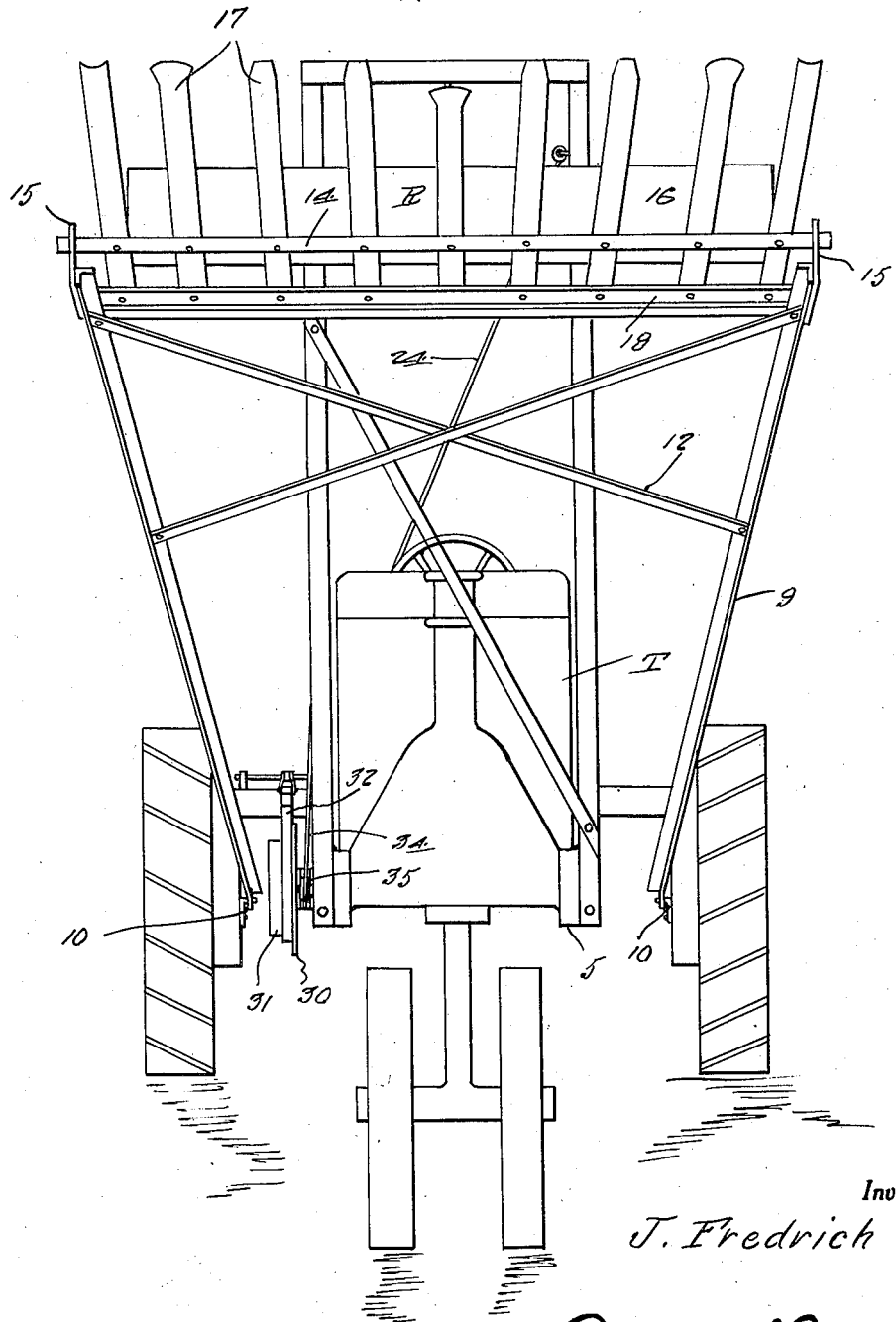

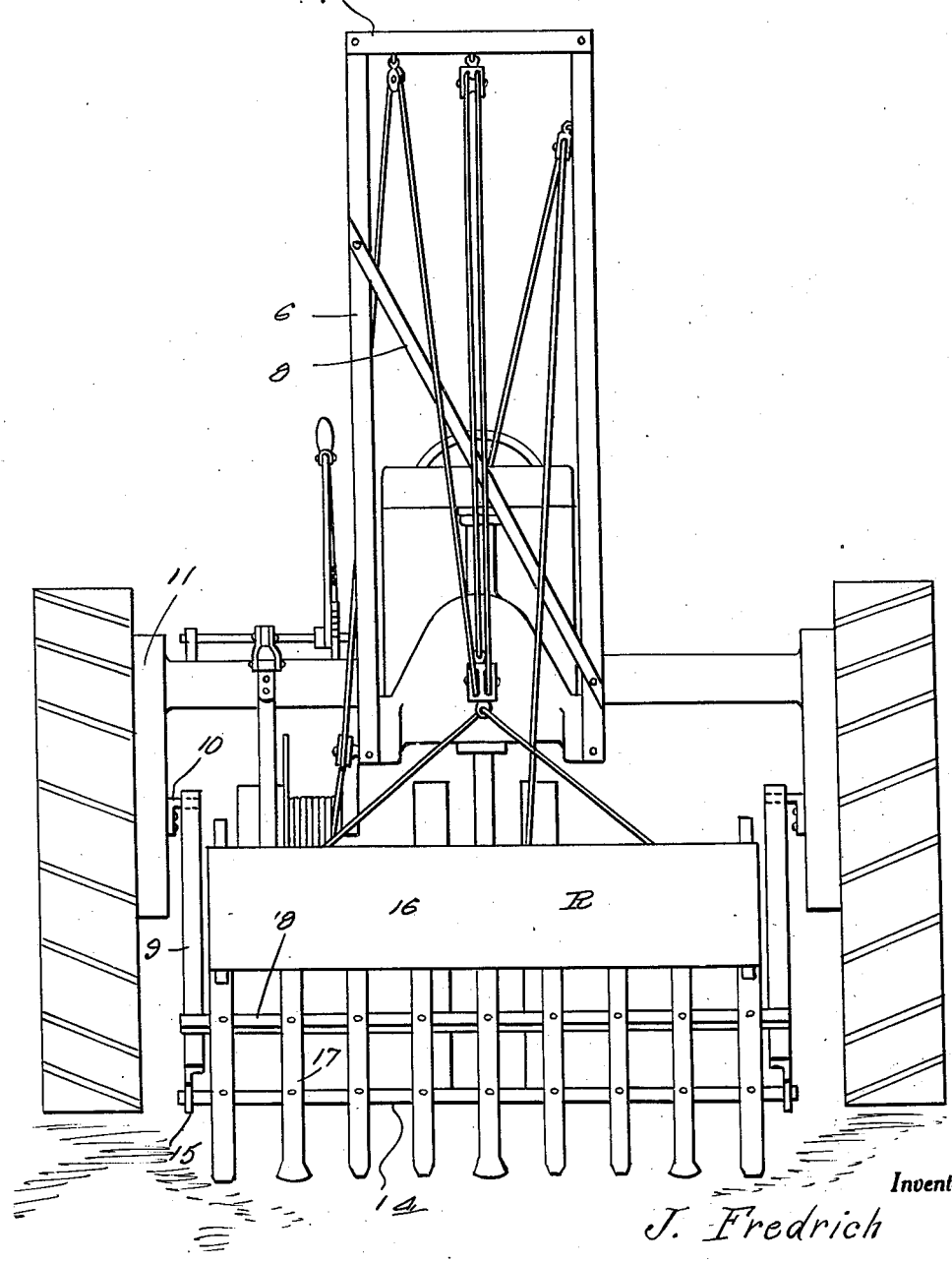

Aug. 16, 1932.                J. FREDRICH                 1,871,599
                              MANURE LOADER
                         Filed Sept. 30, 1930      4 Sheets-Sheet 4
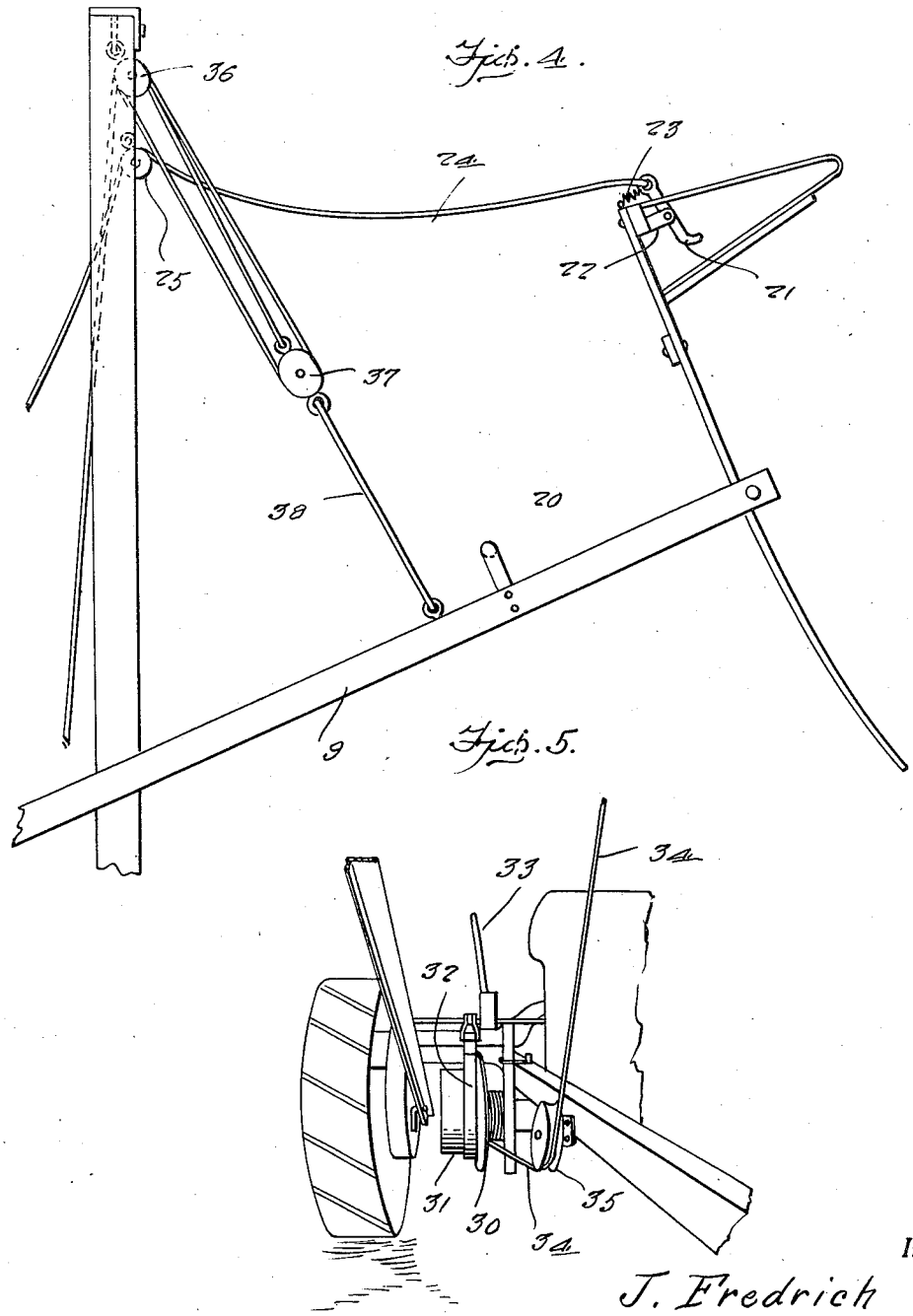
Inventor
J. Fredrich
By Clarence A. O'Brien
Attorney Patented Aug. 16, 1932

1,871,599

UNITED STATES PATENT OFFICE

JOSEPH FREDRICH, OF TYNDALL, SOUTH DAKOTA

MANURE LOADER

Application filed September 30, 1930. Serial No. 485,522.

The present invention relates to a manure loader and has for its prime object to provide an apparatus in the form of an attachment for a tractor and used in loading manure into a spreader or the like.

Another very important object of the invention resides in the provision of an apparatus of this nature which is exceedingly simple in its construction, inexpensive to manufacture, strong and durable, compact and convenient in its arrangement of parts, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a tractor embodying the features of my apparatus, Figure 2 is a front perspective view thereof showing the rake in a raised position, Figure 3 is a similar view showing the rake in a lowered position, Figure 4 is a detail side elevation of the apparatus showing the rake in a dumping position, Figure 5 is a fragmentary detail perspective view to illustrate the drum structure.

Referring to the drawings in detail it will be seen that the letter T denotes the tractor of conventional formation. Rising from the frame 5 of the tractor T is an inverted U-shaped frame comprising a pair of uprights 6 and a cross member 7. A diagonal brace 8 is provided between the uprights 6. A pair of spaced parallel co-extensive arms 9 are located one to each side of the tractor and the rear ends are rockably mounted on trunnions 10 mounted on gear housings 11. A pair of cross diagonal braces 12 are disposed between the arms 9. A transverse bar 14 of a rake structure denoted generally by the letter R has its ends rockable in the forward ends of the arms 9 by means of suitable brackets 15. The rake 14 besides the bar 14 includes back plate 16 with tines 17 projecting forwardly therefrom and attached to the bar 14 and also being braced as at 18. The brace 18 extends out beyond the outermost tine and rests on the arms 9. A cross rod of an inverted U-shaped formation is denoted by the numeral 20 and extends between forward intermediate portions of the arms 9 and is adapted to be engaged by a catch 21 rockable as at 22 on the rear of the rake R. A spring 23 normally holds the catch in engaging position. A releasing cable 24 is engaged with the catch and trained over a pulley 25 on one of the risers 6 and through an eye 26 located adjacent the driver's seat.

An engine operated drum 30 is substituted for the usual take-off pulley of the tractor and this drum has a brake drum extension 31 with brake mechanisms such as bands 32 and actuating means 33 associated therewith. A cable 34 is windable on the drum 30 and is trained over a pulley 35 mounted on one of the side members of frame 5 and the cable is then trained through block and fall elements 36 and 37 in the usual well known manner. The element 37 is attached to the arms 9 by a bridle member 38.

With the rake in lowered position the tractor may be moved forwardly to cause manure or the like to move up on the tines against the back plate. Then the drum may be set into operation to wind the cable 34 thereon swinging the forward ends of the arms 9 and the rake upwardly to the desired height. Then the cable 24 may be jerked to release the catch from the catch rod 20 thereby causing the rake to drop to the unloading position shown in Figure 4.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention what I claim as new is:

A loading attachment for a tractor comprising a pair of uprights having their lower ends connected to the front part of the tractor, one at each side of said front part, a cross piece connecting the upper ends of said uprights together, a pair of forwardly diverging beams located one at each side of the tractor and having their rear ends pivotally connected with the gear housings of the wheels of the tractor, braces connecting said beams together adjacent their front ends, a cross shaft rotatably supported by the front ends of said beams, a rake assembly having the front portion of the prongs fastened to said cross shaft, an inverted U-shaped member having the ends of its limbs connected with intermediate portions of the beams with its bight part forming a seat part for the rake assembly when the same is in lowered position, a pivoted latch carried by the rear part of the rake assembly, for engaging a part of said inverted U-shaped member to hold the assembly in lowered position, a cable connected with the latch for releasing the same and extending to the rear part of the tractor, a pulley carried by one of the uprights over which the cable passes, a drum connected with the take-off shaft of the tractor, brake means for the drum, a cable having one end connected with the drum, a pulley on the cross piece which connects the upper ends of the uprights together and over which the cable passes, a pulley block, a flexible member connecting the same with the forward part of the beams, a pulley block carried by the cross piece and the last-mentioned cable passing through the said blocks, and connected with one of them.

In testimony whereof I affix my signature.

JOSEPH FREDRICH.